United States Patent Office 3,318,661
Patented May 9, 1967

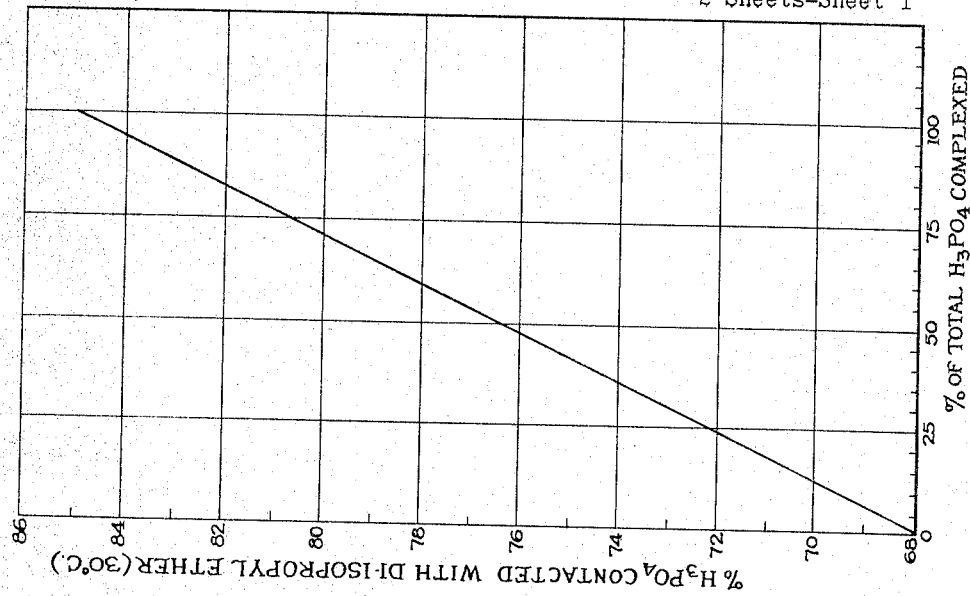
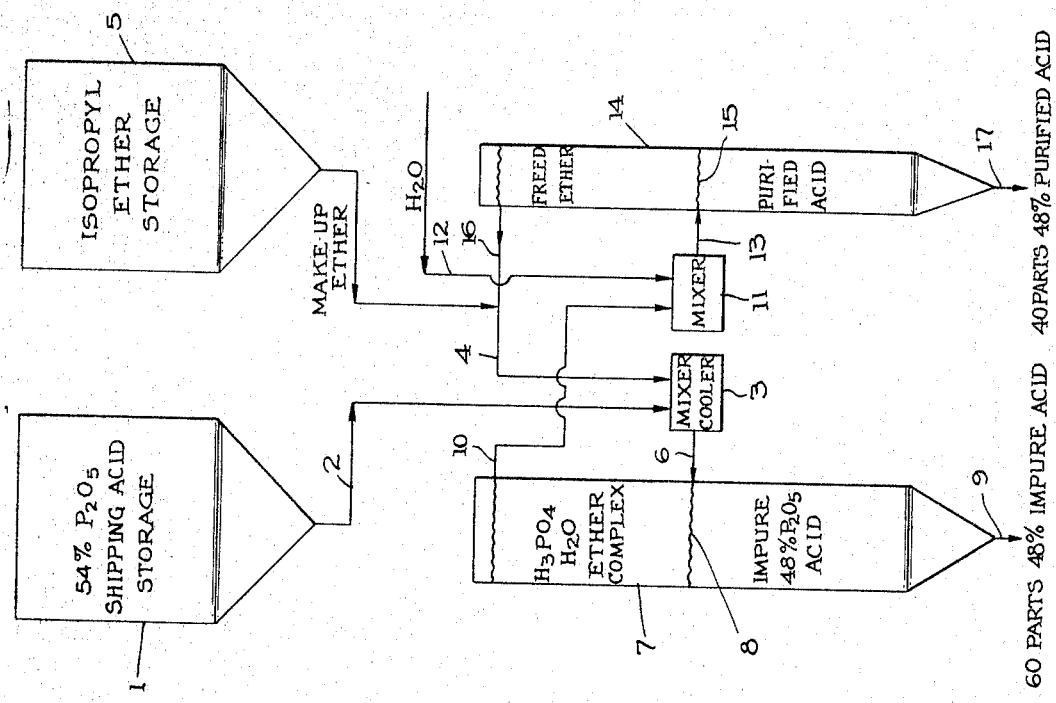

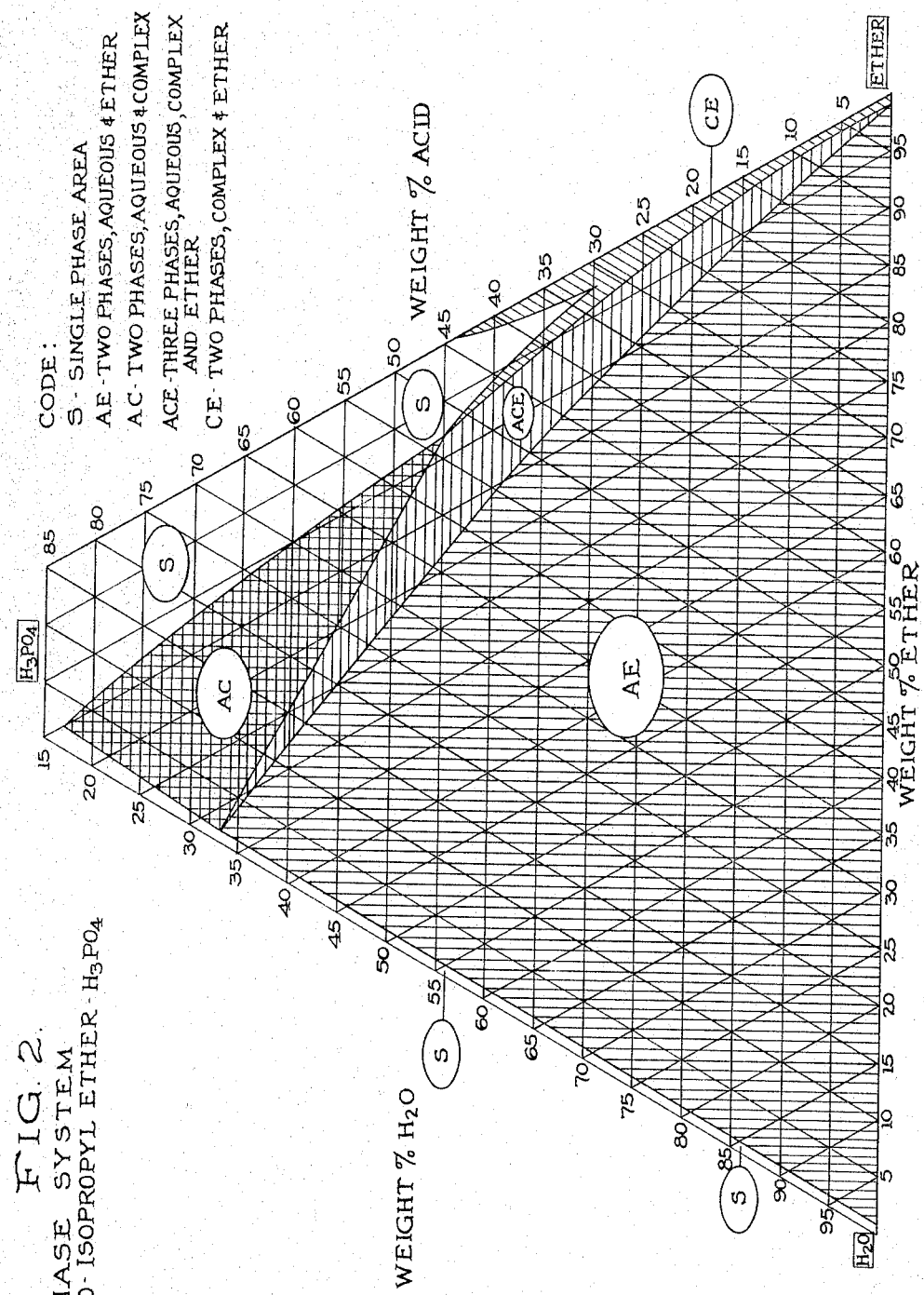

3,318,661
PROCESS FOR PURIFYING PHOSPHORIC ACID
Paul O. Schallert, College Park, and Charles C. Fite, Jr., Atlanta, Ga., assignors to Tennessee Corporation, New York, N.Y., a corporation of New York
Filed Dec. 31, 1962, Ser. No. 248,765
6 Claims. (Cl. 23—165)

This invention relates to improvements in the purification of phosphoric acid and more particularly of wet process acid (WPA) or any equivalent impure phosphoric acid solution.

In the wet process method for manufacturing phosphoric acid, in which phosphate rock is acidulated with a strong mineral acid, relatively large amounts of impurities are dissolved and accompany the crude acid throughout its normal processing stages. The most prevalent impurities are iron, aluminum, calcium, sodium, potassium, fluorine, silica, sulfur, organic matter, uranium, nickel, chromium and there are usually traces of many other materials.

Such impurities do not seriously interfere with the use of the crude acid for purposes such as the manufacture of fertilizer materials, but they do limit the uses of such acid to rather crude products. Many efforts have been made to purify this type of acid so as to broaden its applications in the chemical industry, and some improvements have resulted. For instance, a large amount of impurities can be settled from a concentrated acid. However, a typical analysis of a concentrated acid after partial separation of impurities by settling reveals that considerable impurities still remain in solution or suspension. The following is a typical analysis of a concentrated wet process acid, usually referred to as "shipping acid" (percentages are stated in terms of weight throughout the following specification):

|  | Percent |
| --- | --- |
| $P_2O_5$ | 54.58 |
| Fe | 1.35 |
| Al | 1.87 |
| S | 0.76 |
| F | 0.77 |
| Si | 0.40 |

The acid is usually dark amber to black in color and has a strong characteristic odor.

Many other methods of purifying such an acid have been proposed, but due to the complexity of the impurities and the very narrow price differential between crude "shipping acid" and technical grade furnace phosphoric acid, no satisfactory solution has been achieved.

In the area of liquid extraction a number of solvents effect a desirable purification action on this crude acid, such as tributyl phosphate and n-butanol. However, such procedures leave much to be desired when it comes to separating and recovering the solvent from the purified phosphoric acid. Such solvents are expensive and relatively easy to decompose under strenuous conditions, such as would be encountered in distillation from strong acids.

We have discovered a solution for the above problems in the purification of wet process phosphoric acid (hereafter referred to as WPA) which was completely unpredictable from any prior art of which we are aware. Diisopropyl ether (hereafter referred to as IPE) was found to possess several very unique and selective properties in the system $H_3PO_4$—IPE—$H_2O$. If a phosphoric acid of $H_3PO_4$ strength lying between 68 and 85% (i.e., between about 48% and 62% $P_2O_5$) is shaken with enough IPE to form the maximum amount of the complex represented below, a slightly exothermic reaction results, due to the formation of the following complex:

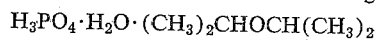

This complex is a moderately thin liquid, which is not appreciably soluble in either aqueous $H_3PO_4$ solutions of 68% or less concentration or in excess IPE.

In general the optimum temperature for the reaction is about 30° C., but temperatures anywhere in the range of 0° C. to about 60° C. can be used if desired. As shown hereinafter, the proportion of $P_2O_5$ extracted decreases at higher temperatures and for this reason it is not desirable to use temperatures above 60° C.

In the drawings, FIG. 1 is a diagrammatic layout of a plant for practicing the invention, FIG. 2 is a phase diagram of the process, and FIG. 3 shows the relation between initial acid strength and amount of acid complexed.

Referring to FIG. 2 (a phase diagram for this system at 30° C.) the area AC is a diphase mixture consisting of aqueous $H_3PO_4$ and the above complex. In this area impurities are concentrated in the aqueous fraction, and the complex layer containing the purified fraction of $H_3PO_4$ can be separated from the aqueous layer. The optimum point for recovery of $H_3PO_4$ is that at which the maximum amount of complex is obtained without forming a third layer of excess ether. This complex normally contains approximately 45% $H_3PO_4$, 8% $H_2O$, and 47% IPE. In the case of 54% $P_2O_5$ WPA, for example, such a complex results from shaking about one volume of IPE with one volume of 54% $P_2O_5$ WPA, and any more ether than this will only be wasted to a third layer. From this mixture 40% of the $P_2O_5$ is recovered in the ether complex, with only a small fraction of the original impurities being present. The remaining 60% of the $P_2O_5$ separates to the bottom of the vessel in the aqueous layer which contains 47–48% $P_2O_5$, less than 1% of IPE, and the bulk of the original impurities. This impure acid, although somewhat more dilute than the original crude wet process acid, can be used for the same purposes such as the manufacture of fertilizers mentioned above.

FIG. 3 shows that the percent recovery of $H_3PO_4$ in the ether complex is directly proportional to the strength of acid used. $H_3PO_4$ of 68% or less concentration will not form any complex with IPE. $H_3PO_4$ of 85% or greater will complex completely with adequate amounts of IPE. Any phosphoric acid lying between 68 and 85% will form certain proportions of complex and 68% $H_3PO_4$ acid depending on the strength of acid used. It will be seen that FIGS. 2 and 3 together provide for determining the approximate amount of IPE needed to fully complex any given amount of $H_3PO_4$ of 68–85% strength at the optimum temperature of about 30° C.

When the proper amount of IPE is used, a diphase mixture consisting of an aqueous 68% $H_3PO_4$ layer and an ether-water-$H_3PO_4$ complex layer results (portrayed in FIG. 2 by AC). It remains only to draw off the aqueous raffinate containing 68% $H_3PO_4$ and the bulk of the impurities, thus leaving the essentially pure $H_3PO_4$ in the ether complex. The purified acid can be separated from the ether by simply distilling the ether from the complex leaving approximately 85% $H_3PO_4$.

If desired, the distillation process can be simplified by first heating the complex phase to a temperature of about 68° C., at which point approximately half of the IPE unexpectedly separates to the top and can be drawn off. The remainder of the IPE can then be removed by distillation and recovered.

A preferred method, however, comprises the addition to the complex phase of just enough water to dilute the 85% strength acid down to 68% strength. At this point, as shown by FIG. 3, the complex of acid and ether cannot exist and the ether separates to the top and forms an upper layer that can be drawn off, leaving acid of 68% $H_3PO_4$ strength containing only about 2% IPE. This method is quick and simple and has the advantage of being endothermic. It also makes further purification possible by drawing off small fractions of stripped acid, while the only ether distillations required are stripping steps on the aqueous fractions. Also the 68% $H_3PO_4$ strength acid thus obtained can be easily decolorized by activated carbon.

The following tables show the effect of temperature and acid strength of wet process acid on the amount of ether needed, percent recovery of *total* $P_2O_5$, and degree of purification obtained:

TABLE 2.—EFFECT OF CONCENTRATION OF WET PROCESS PHOSPHORIC ACID ON THE EXTRACTION WITH ISOPROPYL ETHER AT 30° C.

| Conc. Percent Total $P_2O_5$ | IPE [1] | Percent of Total $P_2O_5$ Extracted | Purity [2] |
|---|---|---|---|
| 51.4 | 105 | 39.0 | <0.1 |
| 54.0 | 110 | 40.0 | 0.1 |
| 57.0 | 240 | 62.4 | 0.2 |
| 59.4 | 265 | 65.0 | 0.3 |
| 62.3 | 290 | [3] | [3] |

[1] Ml. IPE per 100 ml. of acid to obtain maximum complexing.
[2] Percent iron and aluminum on a 68% $H_3PO_4$ basis.
[3] Unsatisfactory separation due to extremely viscous raffinate.

The following examples are illustrative of the results obtained in practice by the use of processes embodying the invention:

*Example 1*

To a 250 ml. separatory funnel was added 100 ml. (167 g.) of WPA shipping acid with the composition given above. IPE (100 ml.) was added, and the mixture was thoroughly shaken and cooled to 30° C. After standing about 15 minutes a bottom dark layer of impure 68% $H_3PO_4$ strength acid was drawn off, and then 20 ml. of water was added to the remaining light amber complex layer. After shaking thoroughly it became cool and quickly separated into an aqueous acid layer and an IPE layer. The following data was obtained:

| | G. | Percent | | | | | |
|---|---|---|---|---|---|---|---|
| | | $P_2O_5$ | Fe | Al | S | F | IPE |
| Aqueous raffinate | 92 | 46.7 | 2.11 | 3.1 | 0.84 | 0.39 | 1 |
| Aqueous purified acid | 74.8 | 46.0 | 0.06 | 0.1 | 0.48 | 0.07 | 2 |

A recovery of 98% of the original amount of ether was obtained after stripping the ether from the above aqueous fractions by heating to 110° C.

*Example 2*

The same acid (100 ml.) was treated with 12 g. of fine mesh triple superphosphate at 100° C. prior to extraction as in Example 1. This triple superphosphate precipitated most of the sulfuric acid as gypsum (before extraction) and the following results were obtained:

| | G. | Percent | | | | | |
|---|---|---|---|---|---|---|---|
| | | $P_2O_5$ | Fe | Al | S | F | IPE |
| Aqueous raffinate | 101 | 46.5 | 2.2 | 3.1 | 0.90 | 0.4 | 1 |
| Aqueous purified acid | 75.3 | 46 | 0.05 | 0.012 | 0.05 | 0.1 | 2 |

TABLE 1.—EFFECT OF TEMPERATURE ON THE EXTRACTION OF 54% $P_2O_5$ WET PROCESS PHOSPHORIC ACID WITH ISOPROPYL ETHER

| Temp., ° C. | IPE [1] | Percent of Total $P_2O_5$ Extracted | Purity [2] |
|---|---|---|---|
| 15 | 150 | 43 | <0.1 |
| 30 | 100 | 40 | 0.1 |
| 45 | 82 | 37 | 0.15 |
| 58 | 55 | 21 | 0.2 |

[1] Ml. of IPE per 100 ml. 54% acid to obtain maximum complexing.
[2] Percent iron and aluminum on a 68% $H_3PO_4$ basis.

This example demonstrates the fact that removal of sulfuric acid reduces the other impurities extracted also.

*Example 3*

In order to demonstrate the fractional stripping principle, the following experiment was performed:

Into a 500 ml. separatory funnel was placed 200 ml. of shipping acid (same as in Example 1) and 232 ml. of IPE. After shaking thoroughly, the mixture was allowed to separate. The dark aqueous raffinate was drawn off, and 5 ml. increments of water were added to the remaining complex and shaken. Each time the aqueous stripped acid fraction was withdrawn and kept separated. This process was continued until all the complex was destroyed. The following data was obtained:

|  | G. | Percent | | | | | |
|---|---|---|---|---|---|---|---|
|  |  | P₂O₅ | Fe | Al | S | F | IPE |
| Raffinate | 197 | 46.7 | 2.11 | 3.1 | 0.84 | 0.39 | 1 |
| 1st aqueous fraction | 16.8 | 46.5 | 1.14 | 0.33 | 0.64 | 0.42 | 2 |
| 2d aqueous fraction | 14.4 | 46.7 | 0.40 | 0.16 | 0.52 | 0.12 | 2 |
| 3d aqueous fraction | 26.95 | 47.4 | 0.14 | 0.14 | 0.49 | 0.05 | 2 |
| 4th aqueous fraction | 29.65 | 45.6 | 0.06 | 0.10 | 0.49 | 0.06 | 2 |
| 5th aqueous fraction | 29.15 | 45.9 | 0.06 | 0.09 | 0.48 | 0.05 | 2 |
| 6th aqueous fraction | 30.3 | 46.1 | 0.05 | 0.08 | 0.44 | 0.07 | 2 |
| 7th aqueous fraction | 21.65 | 45.7 | 0.11 | 0.10 | 0.32 | 0.12 | 2 |

The process can operate successfully as an industrial unit portrayed in FIG. 1. However, there can be many modifications of the basic process depending on the starting materials and end products desired.

Referring now to FIG. 1 and Example 1, shipping acid of the formula already set forth and containing 54% $P_2O_5$ is supplied from a receiver 1 through a line 2 to a mixer and cooler unit indicated diagrammatically at 3 where it is mixed with IPE coming to the mixer 3 via the line 4, partly from the container 5 as a make-up ether and partly by recycling as described below. The resulting mixture of acid-ether complex and aqueous acid passes from the mixer-cooler 3 through the pipe 6 to a separator 7 in which it separates into two layers as indicated diagrammatically by the line 8. The upper layer, as indicated by the phase diagram, FIG. 2, comprises the $H_3PO_4$—$H_2O$—IPE complex, and the lower layer is impure aqueous acid of 68% $H_3PO_4$ strength containing approximately 48% $P_2O_5$. As indicated diagrammatically this impure acid is drawn off through the outlet 9, while the complex is drawn off through the outlet 10 and passes to a second mixer 11 in which it is mixed with an appropriate quantity of water coming from the line 12 so as to dilute the complex to acid of 68% $H_3PO_4$ strength as described in the preferred method of separation set forth above. This mixture then passes through the line 13 to a separator indicated diagrammatically at 14 in which substantially all of the ether separates in an upper layer above the line 15 and is recycled via the line 16 to the feed line 4 leading to the mixer-cooler 3. The purified acid, on the other hand, separates to the bottom of the separator 14 and is withdrawn by the outlet 17. Typically it comprises acid of 68% $H_3PO_4$ strength (approximately 48% $P_2O_5$) with a very low content of impurities as indicated by the foregoing examples.

It will be understood that the invention is not restricted to the details of the foregoing description and that reference should be had to the appended claims for a definition of its limits.

What is claimed is:

1. A process for the purification of phosphoric acid which comprises contacting aqueous impure phosphoric acid at a concentration of 68% to 85% by weight of $H_3PO_4$ with diisopropyl ether at a temperature in the range of 0° C. to 60° C., thereby forming a mixture of an aqueous impure acid phase and a purified acid-water-ether complex phase, separating said two phases, separately withdrawing said complex phase, and recovering said ether and a purified acid from said withdrawn complex phase.

2. The process of claim 1 wherein the impure phosphoric acid is wet process phosphoric acid of 48–62% $P_2O_5$ content and the amount of diisopropyl ether is 0.5–1.5 parts by weight of said acid.

3. The process of claim 1 wherein the ether is recovered from the complex by distillation.

4. The process of claim 3 wherein the complex is heated to about 68° C. to separate part of the ether prior to distillation of the remaining ether from the complex.

5. The process of claim 1 in which the ether is recovered by diluting the complex phase with water to reduce the $H_3PO_4$ concentration to 68% with resultant phase separation between ether and 68% acid.

6. The process of claim 5 wherein the complex phase is fractionally stripped with water to further separate impurities therefrom.

References Cited by the Examiner

UNITED STATES PATENTS 1,981,145 11/1934 Keller _____ 23—165
2,493,915 1/1950 Cross _____ 23—165
2,880,063 3/1959 Baniel et al. _____ 23—165

OTHER REFERENCES

Kolthoff et al.: "Treatise on Analytical Chemistry," part 1, vol. 3, pp. 1311, 1312, 1318, 1319, 1328, 1329, 1331, 1332, 1337, 1355–1364.

Morrison et al.: "Solvent Extraction in Analytical Chemistry," pp. 48, 143, 156, 224, 225.

OSCAR R. VERTIZ, *Primary Examiner.*

MAURICE A. BRINDISI, *Examiner.*

O. F. CRUTCHFIELD, *Assistant Examiner.*